United States Patent Office 2,898,343
Patented Aug. 4, 1959

2,898,343
ANTHRAQUINONE TRIAZOLES

Erwin Klingsberg, Mountainside, N.J., assignor to American Cyanamid Company, New York, N.Y., a corporation of Maine No Drawing. Application November 18, 1957
Serial No. 696,906

6 Claims. (Cl. 260—308)

This invention relates to new triazole derivatives of anthraquinone, and more specifically, it relates to new 1,2,4-triazoles, which are substituted in the 3-, 4-, and 5-positions, the 3-position carrying a 2-anthraquinonyl radical and the 4- and 5-substituents being aryls. The compounds of my invention can be shown by the following formula:

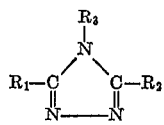

in which $R_1$ is a 2-anthraquinonyl radical and $R_2$ and $R_3$ are aryls. These compounds are useful as intermediates for vat dyes or as vat dyes themselves.

There are several methods of preparing the compounds of my invention. One such method is described in my copending application Serial No. 696,941, filed November 18, 1957. This process involves the reaction of a carbohydrazide with a chloroimide using the following reaction:

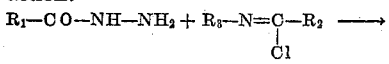

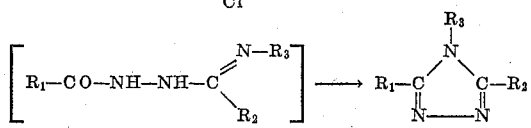

The reaction thus goes through an intermediate amidrazone. In some cases this spontaneously ring closes to the triazole, but in other cases it is necessary to treat the intermediate amidrazone with agents such as thionyl chloride, phosphorus oxychloride, p-toluenesulfonic acid, sulfuric acid, and the like to effect the ring closure. This method is especially useful for preparing the simpler compounds of my invention directly and without complicated extra steps. An example of such a preparation is the following:

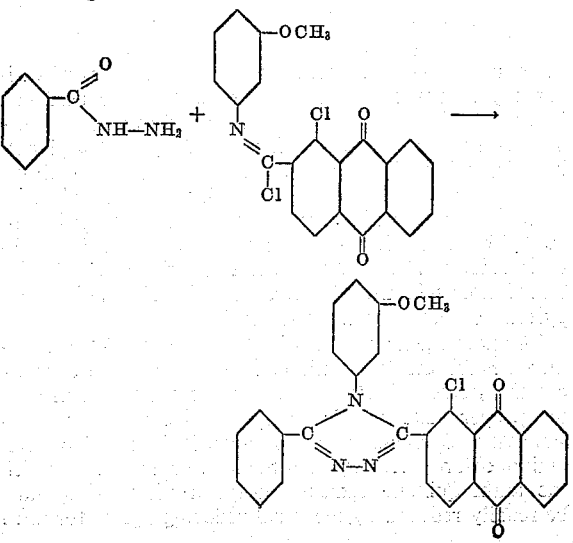

It is to be noted that in this case the anthraquinone group is $R_2$ in the previous schematic equation, but that the final product is equivalent to one in which the anthraquinone is $R_1$. Thus, the same compound can be prepared by the following route:

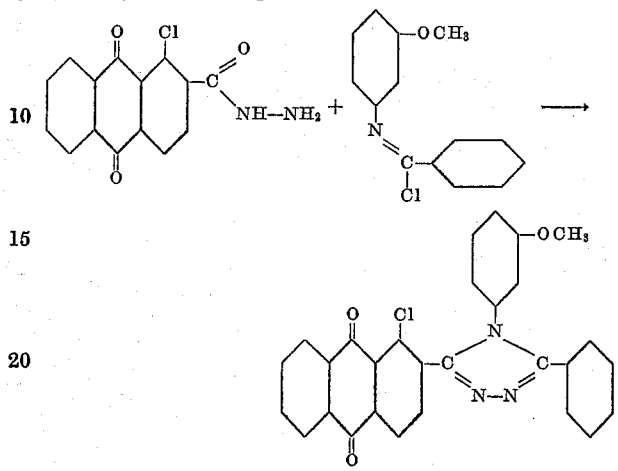

Thus the anthraquinone radical can be in the carboxhydrazide or in the chloroimide. Either reaction with the proper aryl groups in the other positions of the intermediates gives the same reaction product.

In the above anthraquinonyl triazole, the chlorine on the alpha position on the anthraquinone may be replaced by an amino group by autoclaving with strong aqueous ammonia or by reaction with p-toluene-sulfonamide in the presence of a copper catalyst, followed by hydrolysis of the tosyl group. The resulting amino compound comprises a new vat dye for dyeing cotton red.

The above method is a quite effective and simple direct method of preparing the simpler compounds of my invention. However, it has the drawback that some of the more complicated anthraquinone groups can not be introduced into the triazole ring by this method when the desired substituent in the 1-position appears to interfere with the condensation of the carboxhydrazide with the chloroimide. Thus, while the 1-chloroanthraquinone-2-carboxhydrazide, e.g., will react in this manner, the 1-aminoanthraquinone-2-carboxhydrazide will not. Dyes having a 1-amino group must be prepared by a tosylamidation, as described above, of the 1-chloro anthraquinonyl triazoles. However, in many cases additional substituents in 4-position can only be introduced after the 1-position of the anthraquinone-2-carboxylic acid already carried an amino group. Consequently, another and more complicated method for preparing 1,2,4-triazoles, which is not my invention, must be resorted to to prepare these more complicated compounds of my invention. In this method the desired anthraquinone-2-carboxylic acid is converted into an aryl amide which, upon treatment with a halogenating agent such as thionyl chloride or phosphorus pentachloride, forms the corresponding anthraquinonyl aryl chloroimide. This chloroimide is then reacted with hydrazine or hydrazine hydrate in indifferent solvents, as for example dioxane, to form an anthraquinone-2-carboxylic arylide hydrazone. When such a compound is then reacted with a diaryl chloroimide, there is readily formed the 1,2,4-triazole. This preparation can be illustrated by the following equation:

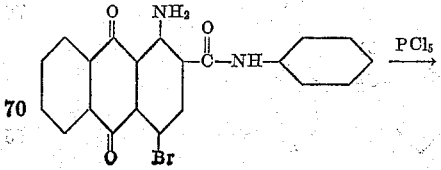

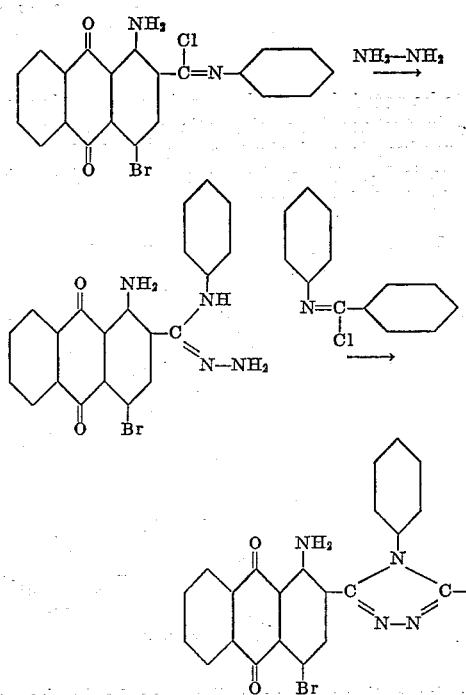

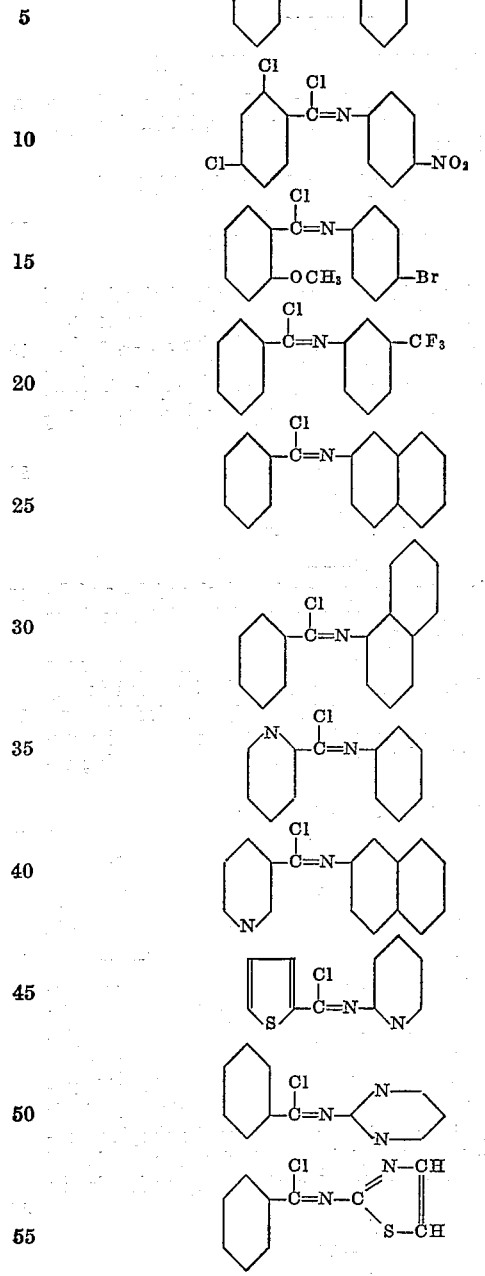

The above vat dye, a red, thus prepared, can now by tosylamidation or by reaction with ammonia under pressure be made into a blue dyestuff by replacement of the bromine with an amino group, followed by acylation. In this latter method of preparation, the anthraquinone must be in the carboxylic arylide hydrazone reactant.

The choice of these methods thus depends on the substituents to be in the anthraquinone ring. With no substituents, or substituents in the other anthraquinone ring from the carboxylic acid group, or with a simple chlorine in the 1-position, the first method can be used, having the anthraquinone group either in the carbohydrazide part of the reaction mixture or in the chloroimide reactant. The introduction of more complicated anthraquinone with other groups in the same ring as the carbon group, especially with amino in the 1 position, requires the use of the more complicated second synthesis, except as amino can be introduced by replacement of the alpha chlorine.

Keeping in mind the above limitation as to the choice of process to be used, the anthraquinone carboxylic acids which may be used as the starting material for either preparation include: anthraquinone-2-carboxylic acid; 1-nitro anthraquinone-2-carboxylic acid, 1-chloro anthraquinone-2-carboxylic acid; 1-amino anthraquinone-2-carboxylic acid; 1-methylamino anthraquinone-2-carboxylic acid; 1-methoxy anthraquinone-2-carboxylic acid; 1-amino-4-nitro anthraquinone-2-carboxylic acid; 1,4-diamino anthraquinone-2-carboxylic acid; 1-amino-4-benzoylamino anthraquinone-2-carboxylic acid; 5-nitro anthraquinone-2-carboxylic acid; 5-amino anthraquinone-2-carboxylic acid; 5-benzoylamino anthraquinone-2-carboxylic acid; and the like. These can be converted either into the hydrazides or into the carboxarylide hydrazones for use in either preparation. They can be reacted with any aryl chloroimide of the structure: $R_2CCl=NR_3$ such as those listed as follows:

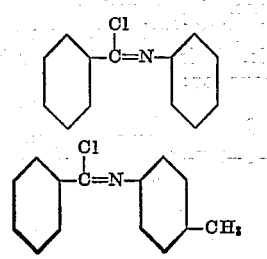

In addition to these compounds, the chloroimides of various arylamides of anthraquinone-2-carboxylic acid can be used in the first process mentioned above in conjunction with the carboxyhydrazides of any simple aryl carboxylic acid, such as benzoic acid, toluic acid, methoxy benzoic acid, dimethoxy benzoic acid, chloro benzoic acid, bromo benzoic acid, nitro benzoic acid, meta-trifluoro methyl benzoic acid, p-benzoyl amino benzoic acid; naphthoic acid, such as 1-naphthoic, 2-naphthoic acid, 3-oxy-2-naphthoic acid, thenoic acid, nicotinic acid and isomeric pyridine carboxylic acids, and the like.

The new triazoles of this invention are useful as intermediates for the preparation of new triazole vat dyes, or are themselves triazole vat dyes when they have present the proper auxochromic groups to give color and substantivity. Such auxochromic groups include amino, acylamino, chloro, methoxy, and the like. Triazoles in which the anthraquinone radical contain a nitro group may be readily reduced by the usual reducing agents for nitro groups to form the amino anthraquinone triazole vat dyes. The amino groups may, if necessary, be acylated to give vat dyes of improved shade and fastness. Such acylation can be with a benzoyl or a substituted benzoyl group or a thenoyl group. In general red shades are obtained when there is an amino group present in the 1-position of the anthraquinone and bluish shades are obtained when there are present amino groups or acylamino groups in the 1- and 4-position. Amino or acylamino groups in the other ring of the anthraquinone from that attached to the triazole ring have less effect on the shade and in general, give reds or red-browns. Halogens on the anthraquinone ring can be used in the Ullmann reaction to form anthrimides with another amino anthraquinone, and such anthrimides can be used per se as vat dyes or they can be carbazolized by reaction with aluminum chloride in manner known to those skilled in dye chemistry. Similarly, anthraquinone radicals having halogen can also be reacted with ammonia or with toluene sulfonamide to introduce another amino group into the anthraquinone radical.

My invention can be illustrated by the following examples in which parts are by weight unless otherwise specified.

*Example 1*

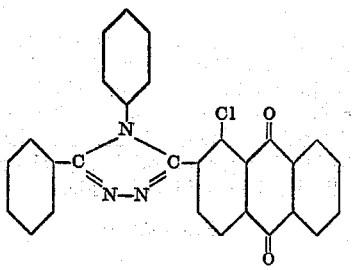

A solution of 0.32 part of 1-chloro-N-phenyl-2-anthraquinonecarboximidyl chloride in 15 parts by volume of o-dichlorobenzene is warmed to about 140° C., and stirred while .012 part of benzhydrazide is added. The mixture is then heated at reflux until triazole formation is complete. It is then cooled, diluted with hexane and the product filtered.

If an equivalent amount of 1-chloro-N-tolyl-2-anthraquinonecarboximidyl chloride is used, the corresponding 4-tolyl triazole is obtained. Similarly, the N-anisyl and N-pyridyl chlorimides give the corresponding 4-substituted triazoles.

*Example 2*

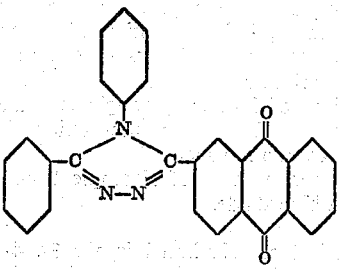

A mixture of 2.0 parts of 2-anthraquinone carboxanilide and 25 parts by volume of thionyl chloride is refluxed until formation of N-phenyl-2-anthroquinonyl chloroimide is complete. The thionyl chloride is then removed by evaporation and final traces removed by adding 15 parts by volume of o-dichlorobenzene and distilling off several parts by volume until the boiling point reaches 180° C.

Benzhydrazide, 1.0 part, is then added to the mixture which is stirred until the reaction is complete. The product is then chilled, diluted with a little benzene, filtered and washed. It is identical with that prepared in Example 4.

*Example 3*

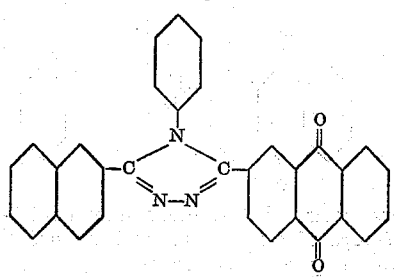

In the preceding example, if instead of 1.0 part benzhydrazide, 1.35 parts of 2-naphthoic acid hydrazide are used, a triazole corresponding to the above formula is obtained. Similarly, the use of equivalent amounts of nicotinic acid hydrazide, instead, produces the compound having a 2-pyridyl radical in place of the naphthyl. Equivalent amounts of thenoyl hydrazide give the triazole with a 2-thenyl radical.

*Example 4*

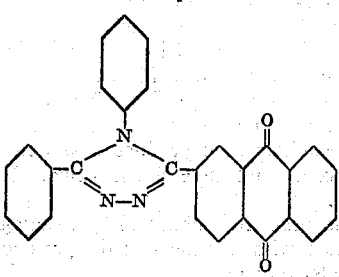

The triazole of Example 2 may be prepared by another method. N-phenylbenzimidyl chloride is prepared from 0.3 part of benzanilide by refluxing with 1 part of thionyl chloride, excess thionyl chloride being removed by heating. After the addition of 3 parts by volume of o-dichlorobenzene and 0.3 part of 2-anthraquinone carbohydrazide, the mixture is stirred at 180° C., until the reaction is complete. It is then cooled and the triazole collected and dried.

This triazole product gives a brown-red vat from which it is recovered unchanged on aeration. It is identical with the triazole obtained by a different method in Example 2.

*Example 5*

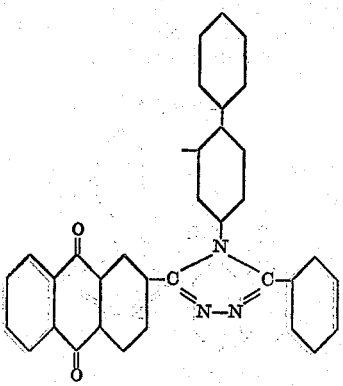

If in the preceding example, N-biphenylbenzimidylchloride is prepared from 0.376 part of N-p-biphenylbenzamide by refluxing with 1 part of thionyl chloride and the product reacted with 2-anthraquinone carbohydrazide, the triazole of the above structure is obtained.

Example 6

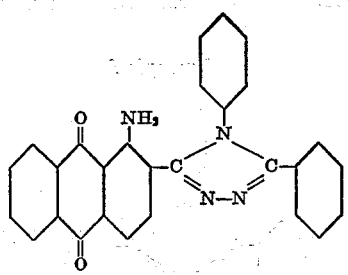

Twenty parts of 1-aminoanthraquinone-2-carboxylic anilide (prepared from aniline and the acid chloride) is heated in 400 parts of chlorobenzene with 11.6 parts of PCl$_5$. The mixture is heated slowly to 100° C. and held there until a solution is obtained. The mixture is filtered and the filtrate is cooled. The 1-aminoanthraquinone-2-carboxylic acid-phenylimide chloride which separates is isolated by filtration and washed with petroleum ether.

Twelve parts of the dried product is mixed with 250 parts of dry freshly distilled dioxane and the mixture is heated to 80–90° C. Ten parts of hydrazine hydrate is added dropwise. The mixture is stirred hot until the reaction is complete and then cooled. The product, 1-aminoanthraquinone-2-carboxylic acid anilide hydrazone, is filtered, washed with methanol and dried.

Six parts of this product is mixed with 3.2 parts of N-phenylbenzimidyl chloride, 160 parts of o-dichlorobenzene, and 10 parts of pyridine. The mixture is heated to reflux until the reaction is complete. It is then cooled and the precipitated red product is filtered, washed with dichlorobenzene and alcohol and dried. It dyes cotton a red shade.

The same product is obtained by reacting the product of Example 1 with ammonia in the presence of cuprous chloride under pressure.

Example 7

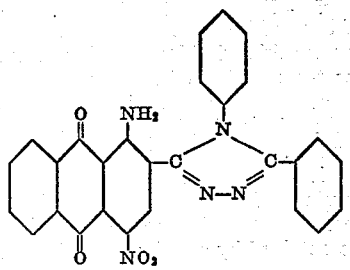

The procedure of Example 6 is followed using an equivalent amount of 1-amino-4-nitroanthraquinone-2-carboxylic anilide in place of the 1-aminoanthraquinone-2-carboxylic anilide. The reddish product is used as an intermediate for dyes of Example 8.

Example 8

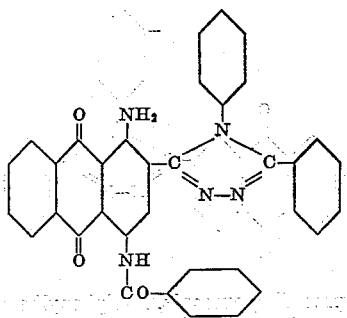

Ten parts of the product of Example 7 is added gradually to a refluxing solution of 50 parts of sodium sulfide in 450 parts of water. The mixture is refluxed for several hours and cooled. The product, the 1,4-diaminoanthraquinonyl compound, is isolated by filtration, washed neutral and dried.

Five parts of the above product is mixed with 50 parts of nitrobenzene and the mixture is stirred at 130° C., while 5 parts of benzoyl chloride is added. The mixture is stirred at 130° C., until the reaction is substantially complete and is then cooled. The precipitated blue dyestuff is filtered, washed with nitrobenzene and alcohol and dried.

Greener blue dyes are obtained by using equivalent amounts of m-trifluoromethyl benzoyl chloride or thenoyl chloride in the above acylation step.

Example 9

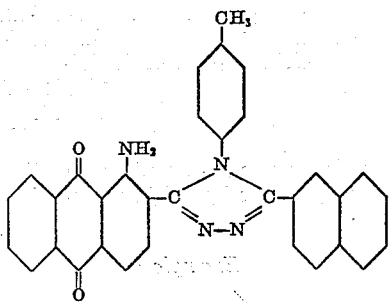

The procedure of Example 6 is used with equivalent amounts of N-p-tolyl-2-naphthimidyl chloride replacing the N-phenylbenzimidyl chloride. Similarly, other aryl groups are placed into the 4- and 5-position in the triazole structure by using instead N-phenyl-2-thiophenecarboximidyl chloride, N-phenylnicotinimidyl chloride, or N-p-anisyl-2,4-dichlorobenzimidyl chloride.

Example 10

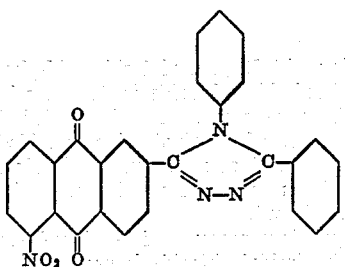

The procedure of Example 1 is followed using 5-nitro-N-phenyl-2-anthraquinonyl carboximidyl chloride in place of the 1-chloro-N-phenyl-2-anthraquinonyl carboximidyl chloride.

Example 11

One-tenth part of the production of Example 6 is vatted by heating it in a solution of 1 part of sodium hydrosulfite and 1 part of caustic soda in 100 parts of water. The mixture is held at 70–80° C., while a piece of cotton cloth of 5 parts by weight is immersed therein for 30 minutes. The cloth is then oxidized and soaped. The cloth is dyed a red shade.

Similarly, the product of Example 8 can be used to dye cotton a blue shade.

I claim:

1. 1,2,4-triazoles substituted in the 3-, 4- and 5-positions, the 3 substituents being a 2-anthraquinonyl radical having in its 1-, 4- and 5-positions substituents selected from the group consisting of hydrogen, nitro, chloro, amino, benzoylamino, thenonylamino and m-trifluoro methyl benzoylamino; the said 2-anthraquinonyl radical having no more than two such substituents, the 4 and 5 substituents in said triazole being aromatic radicals of less than 3 rings, the substituents on which are selected from the group consisting of hydrogen, methyl, methoxy, chloro, bromo, trifluoromethyl, nitro, amino, hydroxy and benzoyl amino, there being no more than two such substituents on said aromatic radicals.

groups to form the amino anthraquinone triazole vat dyes. The amino groups may, if necessary, be acylated to give vat dyes of improved shade and fastness. Such acylation can be with a benzoyl or a substituted benzoyl group or a thenoyl group. In general red shades are obtained when there is an amino group present in the 1-position of the anthraquinone and bluish shades are obtained when there are present amino groups or acylamino groups in the 1- and 4-position. Amino or acylamino groups in the other ring of the anthraquinone from that attached to the triazole ring have less effect on the shade and in general, give reds or red-browns. Halogens on the anthraquinone ring can be used in the Ullmann reaction to form anthrimides with another amino anthraquinone, and such anthrimides can be used per se as vat dyes or they can be carbazolized by reaction with aluminum chloride in manner known to those skilled in dye chemistry. Similarly, anthraquinone radicals having halogen can also be reacted with ammonia or with toluene sulfonamide to introduce another amino group into the anthraquinone radical.

My invention can be illustrated by the following examples in which parts are by weight unless otherwise specified.

*Example 1*

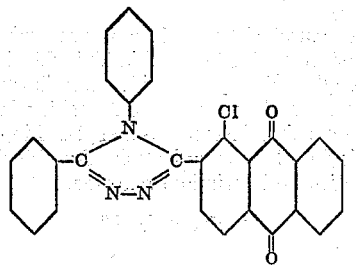

A solution of 0.32 part of 1-chloro-N-phenyl-2-anthraquinonecarboximidyl chloride in 15 parts by volume of o-dichlorobenzene is warmed to about 140° C., and stirred while .012 part of benzhydrazide is added. The mixture is then heated at reflux until triazole formation is complete. It is then cooled, diluted with hexane and the product filtered.

If an equivalent amount of 1-chloro-N-tolyl-2-anthraquinonecarboximidyl chloride is used, the corresponding 4-tolyl triazole is obtained. Similarly, the N-anisyl and N-pyridyl chlorimides give the corresponding 4-substituted triazoles.

*Example 2*

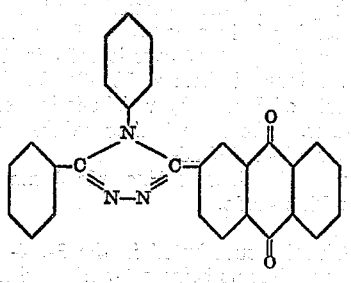

A mixture of 2.0 parts of 2-anthraquinone carboxanilide and 25 parts by volume of thionyl chloride is refluxed until formation of N-phenyl-2-anthroquinonyl chloroimide is complete. The thionyl chloride is then removed by evaporation and final traces removed by adding 15 parts by volume of o-dichlorobenzene and distilling off several parts by volume until the boiling point reaches 180° C.

Benzhydrazide, 1.0 part, is then added to the mixture which is stirred until the reaction is complete. The product is then chilled, diluted with a little benzene, filtered and washed. It is identical with that prepared in Example 4.

*Example 3*

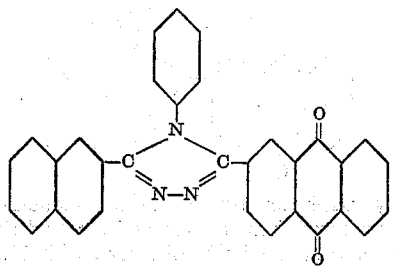

In the preceding example, if instead of 1.0 part benzhydrazide, 1.35 parts of 2-naphthoic acid hydrazide are used, a triazole corresponding to the above formula is obtained. Similarly, the use of equivalent amounts of nicotinic acid hydrazide, instead, produces the compound having a 2-pyridyl radical in place of the naphthyl. Equivalent amounts of thenoyl hydrazide give the triazole with a 2-thenyl radical.

*Example 4*

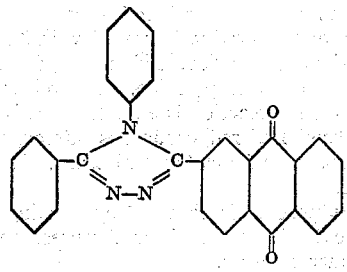

The triazole of Example 2 may be prepared by another method. N-phenylbenzimidyl chloride is prepared from 0.3 part of benzanilide by refluxing with 1 part of thionyl chloride, excess thionyl chloride being removed by heating. After the addition of 3 parts by volume of o-dichlorobenzene and 0.3 part of 2-anthraquinone carbohydrazide, the mixture is stirred at 180° C., until the reaction is complete. It is then cooled and the triazole collected and dried.

This triazole product gives a brown-red vat from which it is recovered unchanged on aeration. It is identical with the triazole obtained by a different method in Example 2.

*Example 5*

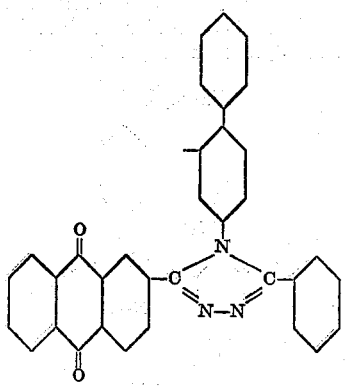

If in the preceding example, N-biphenylbenzimidylchloride is prepared from 0.376 part of N-p-biphenylbenzamide by refluxing with 1 part of thionyl chloride and the product reacted with 2-anthraquinone carbohydrazide, the triazole of the above structure is obtained.

Example 6

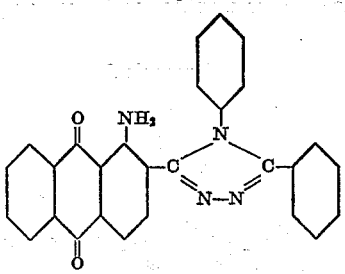

Twenty parts of 1-aminoanthraquinone-2-carboxylic anilide (prepared from aniline and the acid chloride) is heated in 400 parts of chlorobenzene with 11.6 parts of PCl$_5$. The mixture is heated slowly to 100° C. and held there until a solution is obtained. The mixture is filtered and the filtrate is cooled. The 1-aminoanthraquinone-2-carboxylic acid-phenylimide chloride which separates is isolated by filtration and washed with petroleum ether.

Twelve parts of the dried product is mixed with 250 parts of dry freshly distilled dioxane and the mixture is heated to 80–90° C. Ten parts of hydrazine hydrate is added dropwise. The mixture is stirred hot until the reaction is complete and then cooled. The product, 1-aminoanthraquinone-2-carboxylic acid anilide hydrazone, is filtered, washed with methanol and dried.

Six parts of this product is mixed with 3.2 parts of N-phenylbenzimidyl chloride, 160 parts of o-dichlorobenzene, and 10 parts of pyridine. The mixture is heated to reflux until the reaction is complete. It is then cooled and the precipitated red product is filtered, washed with dichlorobenzene and alcohol and dried. It dyes cotton a red shade.

The same product is obtained by reacting the product of Example 1 with ammonia in the presence of cuprous chloride under pressure.

Example 7

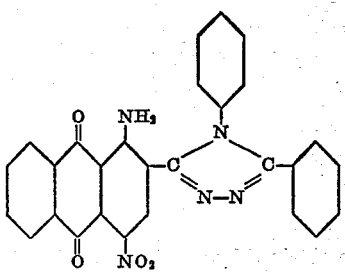

The procedure of Example 6 is followed using an equivalent amount of 1-amino-4-nitroanthraquinone-2-carboxylic anilide in place of the 1-aminoanthraquinone-2-carboxylic anilide. The reddish product is used as an intermediate for dyes of Example 8.

Example 8

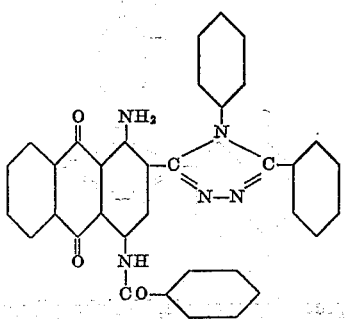

Ten parts of the product of Example 7 is added gradually to a refluxing solution of 50 parts of sodium sulfide in 450 parts of water. The mixture is refluxed for several hours and cooled. The product, the 1,4-diamino- anthraquinonyl compound, is isolated by filtration, washed neutral and dried.

Five parts of the above product is mixed with 50 parts of nitrobenzene and the mixture is stirred at 130° C., while 5 parts of benzoyl chloride is added. The mixture is stirred at 130° C., until the reaction is substantially complete and is then cooled. The precipitated blue dyestuff is filtered, washed with nitrobenzene and alcohol and dried.

Greener blue dyes are obtained by using equivalent amounts of m-trifluoromethyl benzoyl chloride or thenoyl chloride in the above acylation step.

Example 9

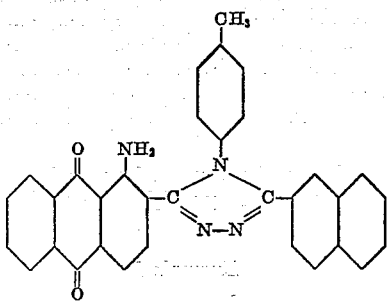

The procedure of Example 6 is used with equivalent amounts of N-p-tolyl-2-naphthimidyl chloride replacing the N-phenylbenzimidyl chloride. Similarly, other aryl groups are placed into the 4- and 5-position in the triazole structure by using instead N-phenyl-2-thiophenecarboximidyl chloride, N-phenylnicotinimidyl chloride, or N-p-anisyl-2,4-dichlorobenzimidyl chloride.

Example 10

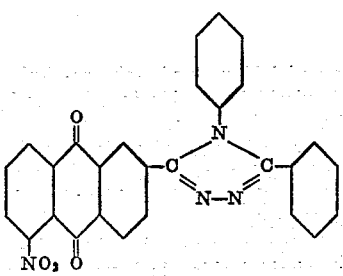

The procedure of Example 1 is followed using 5-nitro-N-phenyl-2-anthraquinonyl carboximidyl chloride in place of the 1-chloro-N-phenyl-2-anthraquinonyl carboximidyl chloride.

Example 11

One-tenth part of the production of Example 6 is vatted by heating it in a solution of 1 part of sodium hydrosulfite and 1 part of caustic soda in 100 parts of water. The mixture is held at 70–80° C., while a piece of cotton cloth of 5 parts by weight is immersed therein for 30 minutes. The cloth is then oxidized and soaped. The cloth is dyed a red shade.

Similarly, the product of Example 8 can be used to dye cotton a blue shade.

I claim:

1. 1,2,4-triazoles substituted in the 3-, 4- and 5-positions, the 3 substituents being a 2-anthraquinonyl radical having in its 1-, 4- and 5-positions substituents selected from the group consisting of hydrogen, nitro, chloro, amino, benzoylamino, thenonylamino and m-trifluoro methyl benzoylamino; the said 2-anthraquinonyl radical having no more than two such substituents, the 4 and 5 substituents in said triazole being aromatic radicals of less than 3 rings, the substituents on which are selected from the group consisting of hydrogen, methyl, methoxy, chloro, bromo, trifluoromethyl, nitro, amino, hydroxy and benzoyl amino, there being no more than two such substituents on said aromatic radicals.

2. The compound:
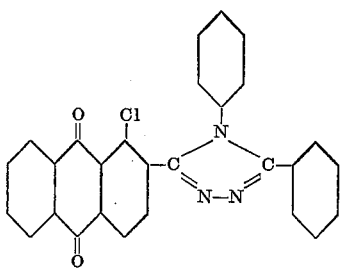
3. The compound:
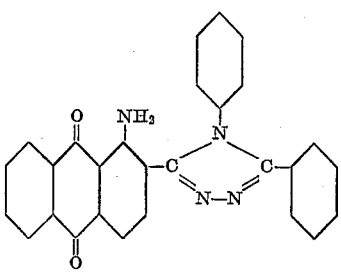
4. The compound:
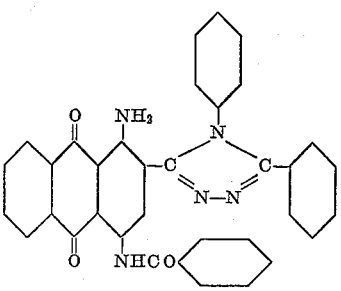
5. The compound:
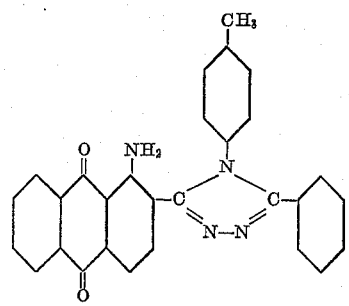
6. The compound:
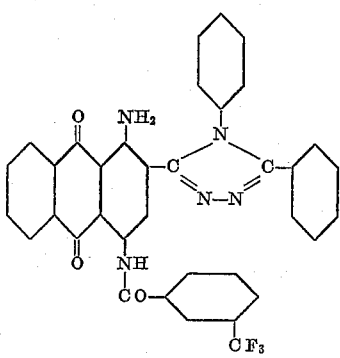
No references cited.

UNITED STATES PATENT OFFICE
CERTIFICATE OF CORRECTION

Patent No. 2,898,343                                                                 August 4, 1959

Erwin Klingsberg

It is hereby certified that error appears in the printed specification of the above numbered patent requiring correction and that the said Letters Patent should read as corrected below.

Column 3, line 43, for "anthraquinone" read -- anthraquinones --; line 44, for "carbon" read -- carbonyl --; column 8, line 67, for "thenonylamino" read -- thenoylamino --.

Signed and sealed this 9th day of February 1960.

(SEAL)
Attest:

KARL H. AXLINE
Attesting Officer

ROBERT C. WATSON
Commissioner of Patents